Nov. 5, 1968 H. MAENNIG 3,409,285
SHOCK ABSORBER ASSEMBLY
Filed Feb. 25, 1966 2 Sheets-Sheet 1
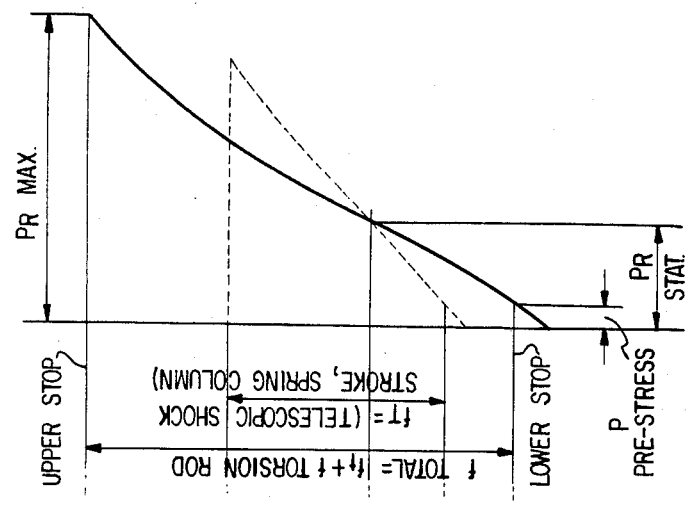
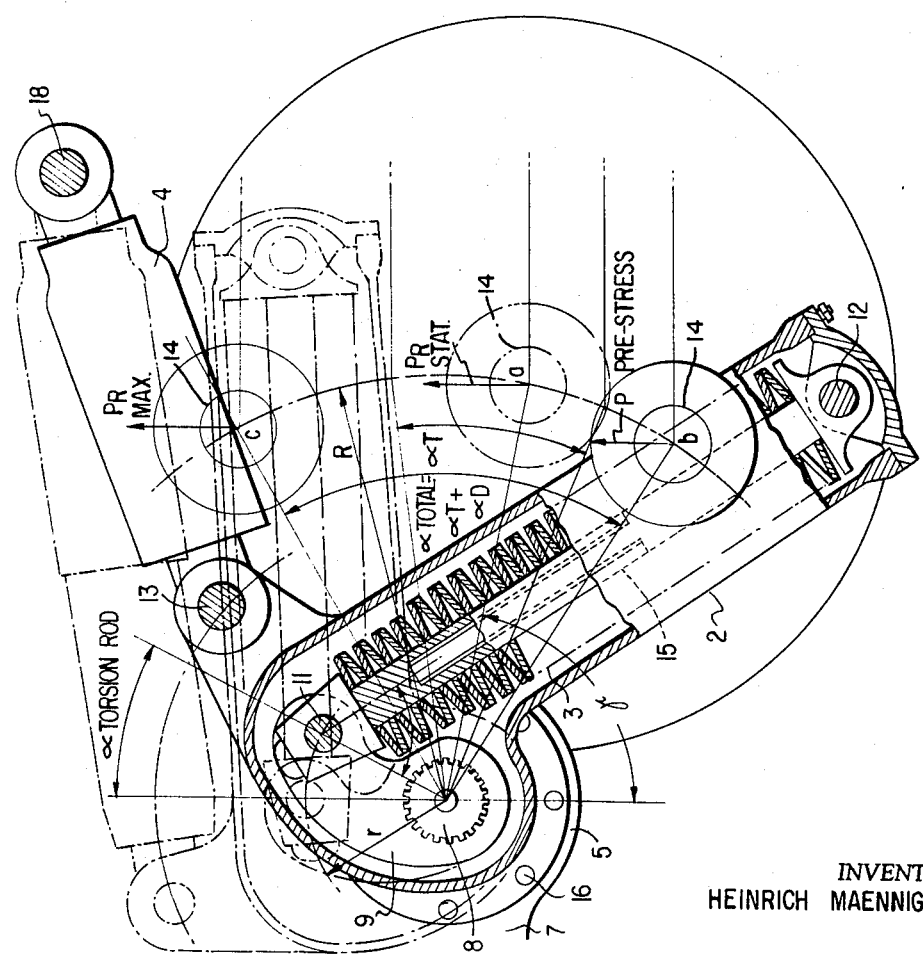
INVENTOR
HEINRICH MAENNIG
BY *James E. Bryan*
ATTORNEY

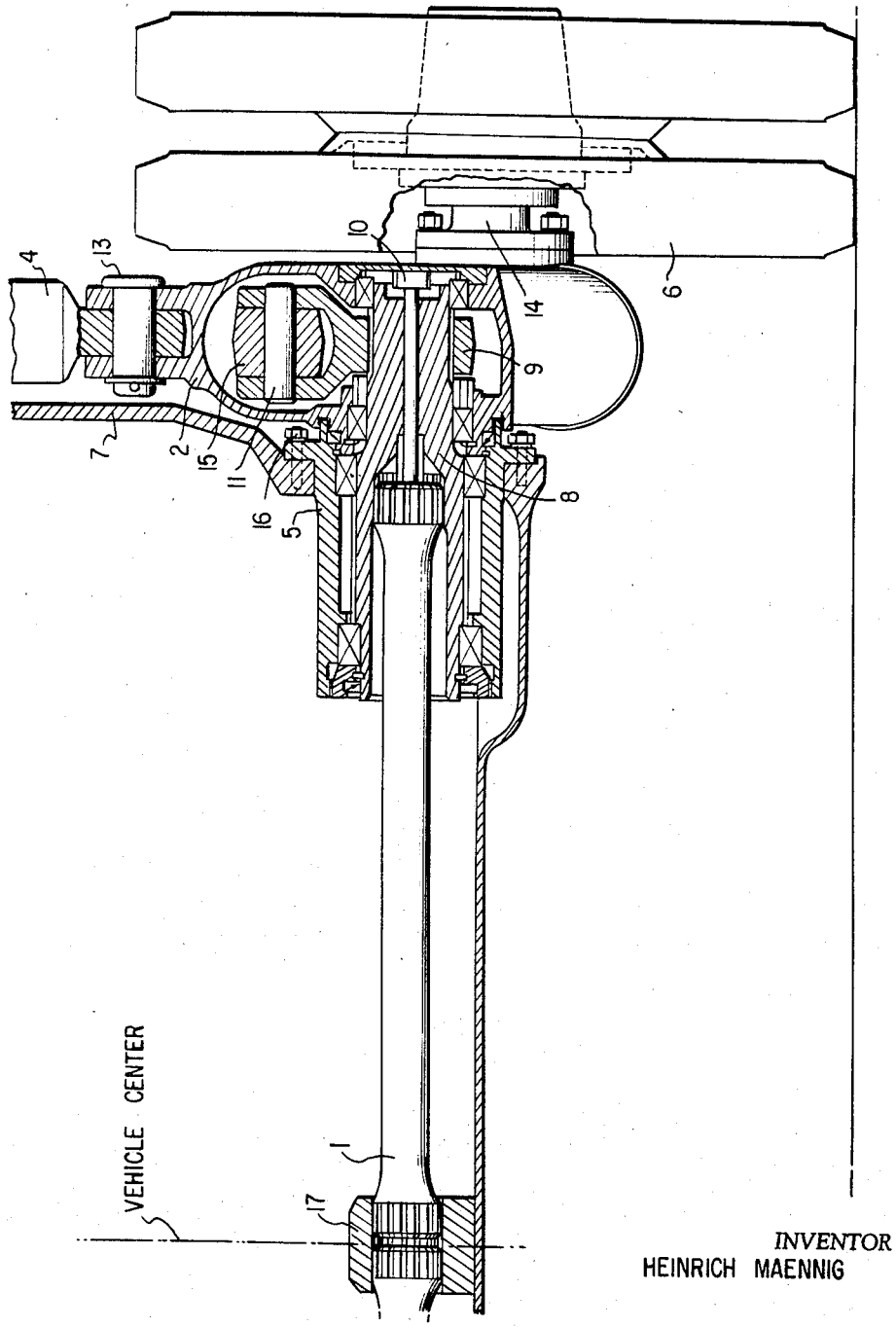

United States Patent Office 3,409,285
Patented Nov. 5, 1968

3,409,285
SHOCK ABSORBER ASSEMBLY
Heinrich Maennig, Kassel, Germany, assignor to Rheinstahl Henschel A.G., Kassel, Germany, a corporation of Germany
Filed Feb. 25, 1966, Ser. No. 530,103
Claims priority, application Germany, July 12, 1965, H 56,562
6 Claims. (Cl. 267—57)

ABSTRACT OF THE DISCLOSURE

A mechanical suspension is provided for a vehicle including a vehicle frame. A torsion bar has one end thereof connected with the frame and the opposite end thereof connected with one end of an axially-acting spring column. The opposite end of the spring column is connected with a housing which supports an axle upon which a wheel is mounted. The housing is also interconnected with a shock absorber which in turn is connected with the vehicle frame.

---

This invention relates to a mechanical suspension system for vehicles and, more particularly, to a mechanical suspension system including a torsion rod spring and an axially-acting spring column connected in series therewith.

Modern high-speed tracked and wheeled vehicles which are suitable for cross-country driving require wheel suspensions having long telescopic shock absorber strokes, large spring deflections, and large springs. The structural bulk of such mechanisms generally can not be accommodated in vehicles in use at the present time. For this reason, it is necessary to make compromises and employ spring suspensions which do not have optimum cushioning properties or to use constructions which are undesirable both with regard to the space they require and from the standpoint of manufacture thereof, such constructions being, for example, hairpin-shaped torsion rods, or torsion rods mounted either diagonally in the vehicle or having offset axles. In such cases, it is necessary to accept the kinematic disadvantages of inaccurate wheel guides thereby produced.

The present invention provides a vehicle wheel suspension having a relatively large spring volume and long spring strokes, so that the zone between the vehicle undercarriage and the road or supporting wheel is utilized to advantage and the structural parts projecting into the interior of the vehicle are restricted to a minimum. Thus, in the construction of the present invention, torsion rods are employed which extend to the center of the chassis and are positioned in the transverse supports, which are present in any event, and, therefore, do not occupy any additional space in the interior of the vehicle.

One embodiment of the present invention, which is a wheel suspension system for a tracked vehicle such as a tank, is illustrated in the accompanying drawings in which FIGURE 1 is a view, partially in section, of a mechanical suspension system according to the present invention, the view being transverse to the direction of travel and showing three positions of the assembly as follows: (a) under static load, (b) totally relieved from load, and (c) spring-cushioned to the maximum extent, FIGURE 2 is a sectional view of the shock absorber assembly of FIGURE 1, shown mounted in the vehicle, the view being in the direction of travel, and FIGURE 3 illustrates the characteristic spring curve of the road or supporting wheel.

The complete mechanical suspension system includes the following structural groups:

(1) torsion spring assembly,
(2) rocker arm housing,
(3) disc spring column or combined ring-disc spring column,
(4) conventional shock absorber, and
(5) suspension mount.

The complete mechanical suspension system is supported in a central bearing 5 which can be introduced laterally from outside into the tank and secured in position by means of the machine screws 16. Accessibility from the interior of the vehicle is not required when mounting the mechanical suspension system assembly in the tank hull.

The torsion rod spring 1 is splined at the right-hand end thereof, as shown in FIGURE 2, to the rocker arm axle 8 and is secured in position by means of the axial bolt 10. The torsion rod 1 is splined at the left-hand end thereof, as shown in FIGURE 2, to the bearing support 17, which latter is secured to the tank hull. The left-hand end of the torsion rod 1 can be axially inserted into the bearing 17 when mounting the mechanical suspension system in the tank from the outside.

A rocker arm 9 is splined to the rocker arm axle 8, as shown in FIGURE 1, the rocker arm 9 having a wrist pin 11 inserted in a bore in a bifurcated end thereof, as shown in FIGURE 2, upon which is mounted the telescopic connecting rod 15 of the disc spring column 3. The connecting rod is secured at the lower end thereof, as shown in FIGURE 1, to the rocker arm housing 2 by means of the pin 12.

The axle 14, upon which the road wheel 6 is mounted, is bolted to the housing 2. A shock absorber 4 of conventional construction is pivotally connected at 13 with the rocker arm housing and, at the other end thereof, to the stationary pivot pin 18 mounted on the hull of the tank 7.

In operation, the strokes of the torsion bar 1 and the spring column 3 are additive since the two elements are connected in series. When the rocker arm axle 8 is restrained, relative to the tank hull, by the torsion rod 1, the spring column operates in the same manner as the known "Dubonnet Knee" with a rocker arm deflection "$\alpha$T."

The combined cushioned wheel suspension of the present invention describes, under an equal load, the total angle $\alpha$ total=$\alpha_T+\alpha_D$, where $\alpha_D$ is the torsion angle of the torsion bar alone.

The cushioned static wheel loads acts upon the torsion bar with the torsional moment $$Md_{stat}=P_{stat}.R.\sin \gamma_{stat}$$

and the disc spring column with the force $$P_{Tstat}=\frac{Md_{s'at}}{\mu\cdot\sin \beta_{stat}}$$

The spring travel under dynamic load corresponds to the same conformity as the coordinated values, of, for example, $P_{max'}\cos \beta_{max'}$ and $\cos \gamma_{max'}$.

In order to obtain optimum cushioning properties, the two elements of the spring suspension, i.e., the torsion bar and the spring column, are coordinated with respect to each other, taking into account the appropriate theoretical correlations.

It will be obvious to those skilled in the art that many modifications may be made within the scope of the present invention without departing from the spirit thereof, and the invention includes all such modifications.

What is claimed is:

1. A mechanical suspension system for a vehicle comprising a vehicle frame, a torsion bar spring having one end thereof operatively connected with said frame, an axially-acting spring column, the opposite end of said torsion bar spring being operatively connected with one end of said spring column, a wheel support means, the opposite end of said spring column being operatively connected with said wheel support means.

2. Apparatus as defined in claim 1 including shock absorber means operatively connected between said wheel support means and said vehicle frame.

3. Apparatus as defined in claim 1 wherein said wheel support means includes a housing, said spring column being disposed within said housing.

4. Apparatus as defined in claim 3 including a shock absorber, said shock absorber being pivotally interconnected with said housing and also being pivotally interconnected with said vehicle frame.

5. Apparatus as defined in claim 1 wherein said opposite end of the torsion bar spring is connected with a rocker arm, said one end of the spring column being connected with the outer end of said rocker arm, said wheel support means including a housing, said rocker arm and said spring column being disposed within said housing, and shock absorber means being pivotally interconnected between said housing and said vehicle frame.

6. Apparatus as defined in claim 5 wherein the suspension system includes flange means whereby the system may be mounted in the vehicle frame from the exterior thereof.

References Cited

UNITED STATES PATENTS

| 298,456 | 5/1884 | Fallesen | 267—22 |
| 865,259 | 9/1907 | Loeffler | 267—22 |
| 3,178,200 | 4/1965 | Backaltis et al. | 267—57 X |
| 3,317,204 | 5/1967 | Maennig et al. | 267—57 |

FOREIGN PATENTS 1,274,328   9/1961   France.

ARTHUR L. LA POINT, *Primary Examiner.*

R. M. WOHLFARTH, *Assistant Examiner.*